United States Patent [19]

Shida

[11] Patent Number: 4,672,464
[45] Date of Patent: Jun. 9, 1987

[54] METHOD AND SYSTEM FOR RECORDING A PARTIALLY DISTORTED IMAGE

[75] Inventor: Junji Shida, Kyoto, Japan

[73] Assignee: Dainippon Screen Mfg. Co., Ltd., Kyoto, Japan

[21] Appl. No.: 586,122

[22] Filed: Mar. 5, 1984

[30] Foreign Application Priority Data

May 9, 1983 [JP] Japan ................... 58-81373

[51] Int. Cl.$^4$ ............................................. H04N 1/04
[52] U.S. Cl. ........................................ 358/287; 382/47
[58] Field of Search .................... 358/287, 77; 382/47

[56] References Cited

U.S. PATENT DOCUMENTS

| | | | |
|---|---|---|---|
| 3,976,982 | 8/1976 | Eiselen | 358/287 |
| 4,163,605 | 8/1979 | Yamada | 358/287 |
| 4,470,074 | 9/1984 | Yamada | 358/287 |
| 4,538,183 | 8/1985 | Kanno et al. | 358/287 |
| 4,561,024 | 12/1985 | Tamura | 358/287 |
| 4,570,187 | 2/1986 | Oho et al. | 358/287 |
| 4,591,904 | 5/1986 | Ijrabe et al. | 358/287 |

FOREIGN PATENT DOCUMENTS

| | | |
|---|---|---|
| 009378 | 2/1980 | European Pat. Off. . |
| 2047042 | 11/1980 | United Kingdom . |
| 2064913 | 6/1981 | United Kingdom . |
| 2086690 | 5/1982 | United Kingdom . |
| 2088671 | 6/1982 | United Kingdom . |
| 2096429 | 10/1982 | United Kingdom . |
| 2100093 | 12/1982 | United Kingdom . |

*Primary Examiner*—Edward L. Coles, Sr.
*Attorney, Agent, or Firm*—Lowe, Price, LeBlanc, Becker & Shur

[57] ABSTRACT

In reproducing an image, partial distortion (especially partial enlargement) is performed on desired portions of the image according to magnification data for the desired portions determined by a means for determining magnification ratio along any of the dimensions of the image.

25 Claims, 14 Drawing Figures

METHOD AND SYSTEM FOR RECORDING A PARTIALLY DISTORTED IMAGE

FIELD OF THE INVENTION

This invention relates to a method and system for performing a distortion, such as enlargement or reduction, on desired portions of a reproduction image of an original picture.

BACKGROUND OF THE INVENTION

Generally, printed matter such as a letter, picture, map or design drawing, or a television image is reproduced in a fixed magnification ratio throughout its full surface. However, on the other hand there is a need to distort several portions of an original picture when it is reproduced in order to heighten its attractiveness. To realize the idea, conventionally the following methods are adopted. One is to reduce the density of the portions to be de-emphasized when reproduced, while the rest is reproduced as it is. Another is to express the portions to be de-emphasized in monochrome image when reproduced, while the rest is reproduced in natural color. In comparison with these methods, there is required a method such that the portions of higher information density are enlarged, while the portions of lower information density are reduced. As an embodiment of this method, a special lens such as a fisheye lens is used. However, such a fisheye lens is not suitable for reproducing optional portions of an original picture in optional magnification ratios. In addition, when more than two portions of an original picture must be distorted, plural reproduction images obtained from the original picture are synthesized, which is also a difficult taks.

SUMMARY OF THE INVENTION

In reflection on the above problem, the method of this invention is proposed. A main object of this invention is to obtain a partially distorted (for example, partially enlarged) image by performing a magnification conversion on several desired portions of an original picture when it is reproduced.

Basically, such a partial magnification conversion can be attained by controlling a process of writing or reading of image data into or from a memory using data obtained by a combination of such devices as address setters and magnification ratio (or the inverse number of the magnification ratio) setters.

When more than two portions of an original picture must be distorted, a random access memory (RAM) is necessary instead of the abovementioned setters for applying the method of this invention.

Furthermore to perform more complicated partial distortion, the following method can be used. At first, parameters of an equation such as equations (1) or (7) (mentioned later) for designating the magnification ratios of the main and the sub-scanning direction factors are stored into a RAM. Then the magnification ratio of both direction factor of corresponding position is computed by a computation means using the parameters and the address data of the positions to be distorted.

The above and other objects and features of this invention can be appreciated more fully from the following detailed description when read with reference to the accompanying drawings.

BRIEF DESCRIPTION OF THE DRAWINGS

FIG. 6a–d show relations between original pictures and respective reproduction images of this invention.

PREFERRED EMBODIMENT OF THE INVENTION

Figure 1:
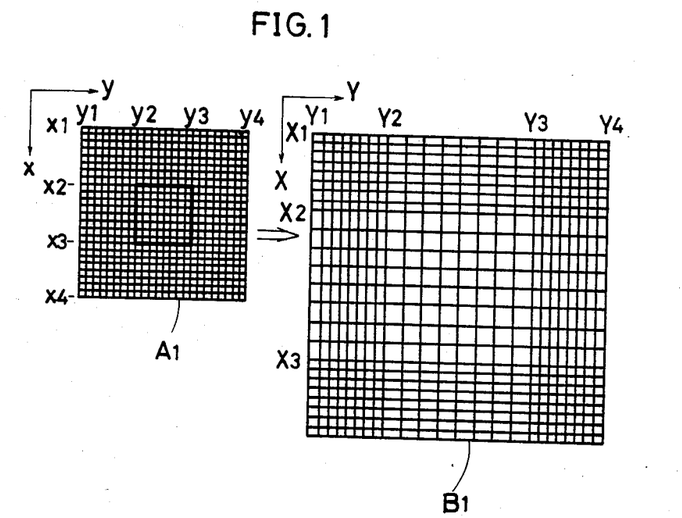
FIG. 1 shows a relation between an original picture and a reproduction image thereof according to the present invention.

FIG. 1 shows a relation between an original picture and one of its reproduction images according to the invention, in which the square surrounded by lines $x_2$, $x_3$, $y_2$ and $y_3$ of the original picture $A_1$ is enlarged to the square surrounded by lines $X_2$, $X_3$, $Y_2$ and $Y_3$ of the reproduction image $B_1$. Precisely, for the main scanning direction, the interval between $X_2$ and $X_3$ of each scanning line is scanned in a specific magnification ratio as against the interval between $X_1$ and $X_2$ or the interval between $X_3$ and $X_4$. Likewise, for the sub-scanning direction, the interval between $Y_2$ and $Y_3$ is to be in a distinct magnification ratio as against the interval between $Y_1$ or the interval between $Y_3$ and $Y_4$.

Figure 2:
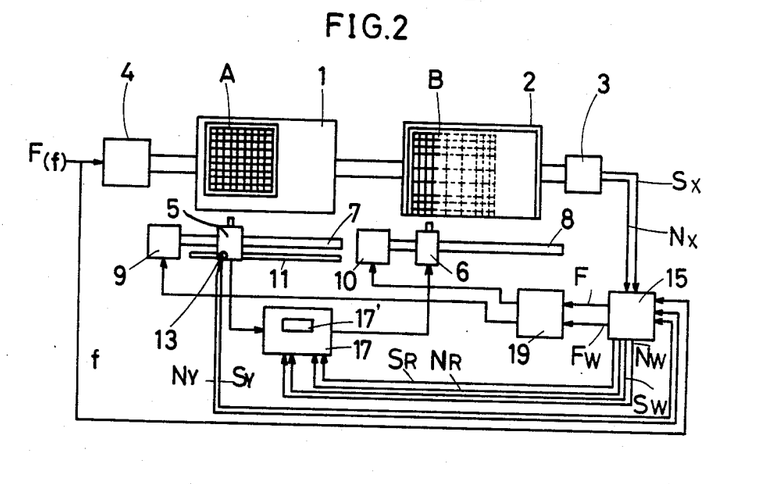
FIG. 2 shows a block diagram of a system for obtaining the reproduction image shown in FIG. 1.

FIG. 2 shows a block diagram of a color scanner system for obtaining a patially enlarged reproduction image as in FIG. 1 to which the method of this invention is applied.

In FIG. 2, an original picture drum 1, a recording drum 2, a rotary encoder 3 and a drum motor 4 revolve coaxially. An input head 5 and a recording head 6 are equipped against the original picture drum 1 and the recording drum 2 respectively. And the input head 5 and the recording head 6 are moved along respective feeding gears 7 and 8 by the revolution power of respective motors 9 and 10. The rotary encoder 3 outputs a main scanning start pulse ($S_X$) which is generated once a revolution of the original picture drum 1 (recording drum 2) and a n time pulse ($N_X$) which is generated n times a revolution of the original picture drum 1 (recording drum 2) to a timing pulse generator 15. The timing pulse generator 15 generates a writing pulse ($N_W$), a writing start pulse $S_W$), a reading pulse ($N_R$) and a reading start pulse ($S_R$) by using said two pulses ($S_X$) and ($N_X$). The pulses ($N_W$), $S_W$), ($N_R$) and ($S_R$) control input or output timing of image data into or from a computer module 17.

The input head 5 scans an original picture A placed on the drum 1 to obtain its analog image data. The analog image data are converted into digital image data on command of the writing pulse ($N_W$) in the computer module 17. Then the digital image data are stored into an internal memory 17' of the computer module 17. The digital image data are read from the internal memory 17' on command of the reading start pulse ($S_R$) and the reading pulse ($N_R$) to be analog image data again. And the analog image data are used for driving the recording head 6 which exposes a photosensitive film B placed on the drum 2.

On the other hand, a linear encoder 11 generates a sub-scanning start pulse ($S_Y$) and a sub-scanning pulse ($N_Y$) for detecting the position of the input head 5 and input the pulses to the timing pulse generator 15.

The timing pulse generator 15 generates motor control pulses ($F_W$) having frequency of (($f_W$)) and ($F_R$) having frequency of (($f_R$)) by using said pulses ($N_Y$) and ($S_Y$) and a signal (F) having frequency of ((f)) for driving the drum motor 4 and input them to a motor controller 19 which controls the revolution frequency of the motors 9 and 10.

Figure 3:
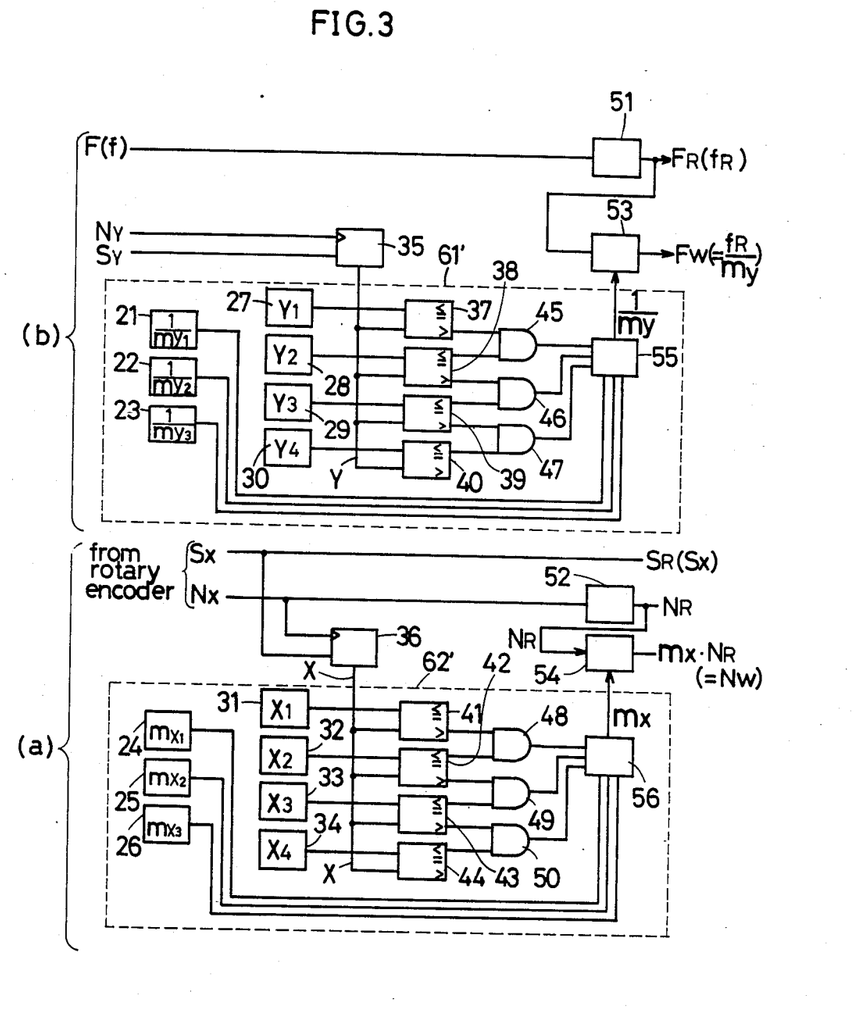
FIG. 3 shows a detailed block chart of a timing pulse generator.

To perform a magnification conversion on several portions of the original picture by using the thus constructed system, the frequency ratio between the writing pulse ($N_W$) and the reading pulse ($N_R$) must be varied for the main scanning direction factor, and the revolution frequency ratio between the motor 9 and the motor 10 must be varied for the sub-scanning direction factor. FIG. 3 shows a detailed block diagram of the timing pulse generator 15, which controls timing for converting the frequencies of the pulses ($N_W$), ($N_R$) and so forth.

FIG. 3(a) shows a section of the timing pulse generator 15, in which the n-time pulse ($N_X$) obtained from the rotary encoder 3 is input to a PLL circuit 52. The reading pulse ($N_R$) for reading image data from the internal memory 17' obtained by multiplying the frequency of the n time pulse ($N_X$) in the PLL circuit 52 and is output to a synthesizer 54. The writing pulse ($N_X$) having frequency of (($m_X \cdot n_R$)) is obtained by multiplying a magnification ratio $m_X$ by the frequency (($n_R$)) of said reading pulse ($N_R$) in the synthesizer 54. The main scanning start pulse ($S_X$) and the n time pulse ($N_X$) are input to a counter 36, of which count number is increased by 1 every time the n time pulse ($N_X$) is input thereto, and is input to comparators 41 to 44 (mentioned later). The count number of the counter 36 is reset to zero every time the main scanning start pulse ($S_X$) is input to the counter 36.

Main scanning direction address data of the lines ($X_1$),($X_2$),($X_3$) and ($X_4$) of the original picture $A_1$ are stored in the address setters 31, 32, 33 and 34 respectively, and the address data ($X_1$),($X_2$),($X_3$) and ($X_4$) are input to said comparators 41, 42, 43 and 44 respectively. When the count number X of the counter 36 is $X_1 < X \leq X_2$, an AND-gate 48 is opened by outputs from the >terminal of the comparator 41 and the $\leq$ terminal of the comparator 42, and the AND-gate 48 outputs a "H" (high level) signal to a multiplexer 56. The multiplexer 56 inputs the magnification data $m_{X1}$ for the interval between ($X_1$) and ($X_2$) in the main scanning direction from a magnification ratio setter 24 to the synthesizer 54 according to the "H" signal. Likewise, when the count number X is $X_2 < X \leq X_3$, an AND-gate 49 is opened to input the magnification data $m_{X2}$ from a magnification ratio setter 25 to the synthesizer 54. When the count number X is $X_3 < X \leq X_4$, an AND-gate 50 is opened to input the magnification data $m_{X3}$ from a magnification ratio setter 26 to the multiplier 54. Then the synthesizer 54 generates the writing pulse ($N_W$) having the frequency of (($m_X \cdot n_R$))(specifically $M_{X1} \cdot n_R$, $m_{X2} \cdot n_R$ and $m_{X3} \cdot n_R$) as mentioned before.

FIG. 3(b) shows the other section of the timing pulse generator 15 for obtaining the motor control pulses ($F_R$) and ($F_W$) for the sub-scanning direction factor. Basically, structure of the section of FIG. 3 (b) is as same as the section of FIG. 3(a). In the second section, a counter 35, inverse magnification ratio setters 21 to 23, address setters 27 to 30, comparators 37 to 40, AND-gates 45 to 47, a multiplexer 55, a synthesizer 53 and a PLL circuit 51 correspond to the counter 36, the magnification ratio setters 24 to 26, the address setters 31 to 34, the comparators 41 to 44, the AND-gates 48 to 50, the multiplexer 56, the synthesizer 54 and the PLL circuit 52 respectively. In the thus constructed section of FIG. 3(b), the sub-scanning pulse ($N_Y$) and the sub-scanning start pulse ($S_Y$) are input from the linear encoder 11 to a sub-scanning counter 35, wherein the pulse ($N_Y$) is used for increasing a count number of the counter 35 and the pulse ($S_Y$) is used for resetting the count number to zero. According to the count number of the counter 35 and sub-scanning address data of the lines $Y_1$, $Y_2$, $Y_3$ and $Y_4$ of the original picture $A_1$ stored in respective address setters 27, 28, 29 and 30, the comparators 37, 38, 39 and 40 open the AND-gates 45, 46 and 47 in response to each case to input a proper magnification data $1/m_y$ (specifically, $1/m_{y1}$ $1/m_{y2}$ and $1/m_{y3}$) (which is the inverse number of the magnification data ($m_y$)) stored in the magnification ratio setters via the multiplexer 55 to the synthesizer 53. Meanwhile the PLL circuit 51 generates the control pulse ($F_R$) having the frequency of (($f_R$)) for driving the motor 10 for feeding the recording head 6 by using the signal (F) having the frequency of ((f)). By using the signal ($F_R$) and the inverse magnification data $1/m_y$, the synthesizer 53 generates the control pulse ($F_W$) having the frequency of (($f_R \times 1/m_y$)) = (($f_R/m_y$)) (concretely $f_R/m_{y1}$, $f_R/m_{y2}$ and $f_R/m_{y3}$) for driving the motor 9 for feeding the input head 5.

Incidentally, as the computer module 17 for color computation or data storage may be an ordinarily functioning computer, no explanation for it is given here. And the internal memory 17' is required to have two memory units, each of which has a capacity for one scanning line, whereby one performs writing procedure of image data while the other alternatively performs a reading procedure.

Figure 4:
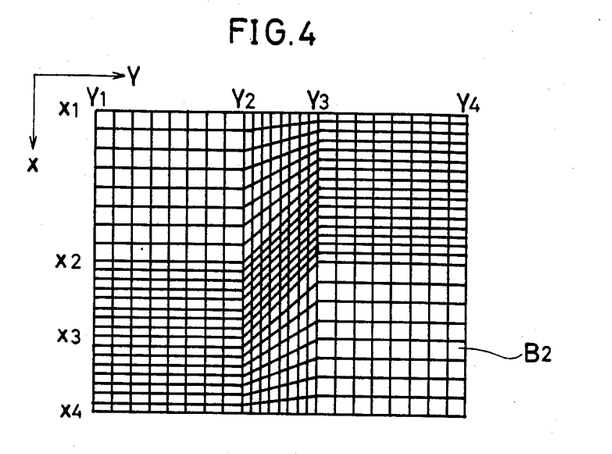
FIG. 4 shows another reproduction image made by using the method of this invention.
Figure 5:
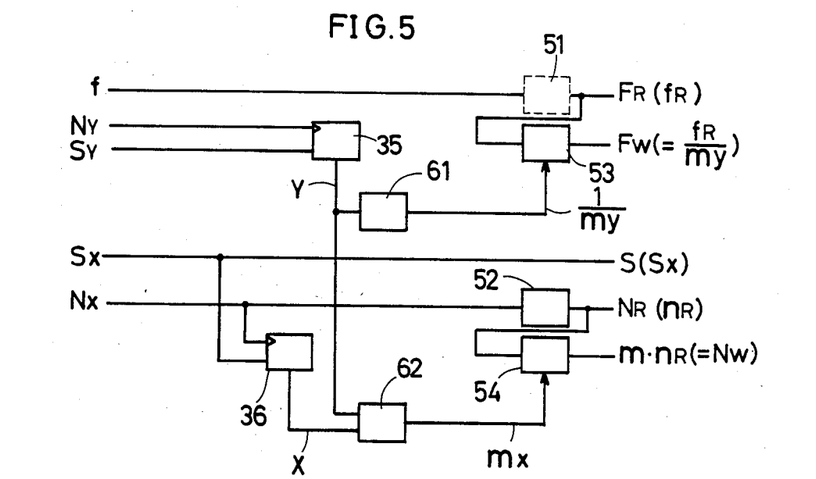
FIG. 5 shows a block chart of a circuit for obtaining the reproduction image shown in FIG. 4.

FIG. 4 shows another reproduction image made by using the method of this invention in which two portions of an original picture are enlarged. And FIG. 5 shows another embodiment of the timing pulse generator 15. Of course, provision of additional units of such as the inverse magnification ratio setters 21 to 23, the magnification ratio setters 24 to 26, the address setters 27 to 34, the comparators 37 to 44 and the AND-gates 45 to 50 enables the timing pulse generators 15 of FIG. 3 manage to record the reproduction image of FIG. 4. However such a measure brings about a complicated manufacturing procedure of the circuit. So, in the embodiment of FIG. 5, random access memories 61 and 62 are substituted for magnification conversion parts 61' and 62' as shown in FIG. 3 for simplification.

In the embodiment of FIG. 5, the count number of a counter 35 corresponding to a sub-scanning position (Y) of an original picture represents corresponding address of a RAM 61. Then inverse magnification data $1/m_y$ stored in a specific address of the RAM 61 is input to a synthesizer 53. The synthesizer 53 outputs the motor control pulse ($F_W$) having the frequency of (($f_R/m_y$)) for controlling the revolution frequency of the motor 9 by performing a multiplication $f_R$ (the frequency of the motor control pulse ($F_R$) input from a PLL circuit 51)

×1/$m_y$ (the inverse magnification data). Meanwhile, the count number of a counter 36 corresponding to a main scanning position (X) of an original picture represents the corresponding address of a RAM 62. Then magnification data $m_x$ stored in a specific address of the RAM 62 is input to a synthesizer 54. The synthesizer 54 outputs the main scanning writing pulse ($N_W$) having the frequency of (($m_x \cdot n_R$)). On the reproduction image $B_2$ of FIG. 4, for example the scanning lines situated between the interval between $Y_2$ and $Y_3$ are recorded in a distinct magnification ratio. Namely, as the magnification distribution becomes two-dimensional, the RAM 62 must store such two-dimensional magnification data. Therefore, the RAM 62 must take in the output of the counter 35 for the main scanning addresses and the output of the counter 36 for the sub-scanning addresses. The address data can be written into the RAM 61 and 62 by using a keyboard, a central processing unit (CPU) and other circuits (not shown in Drawings) by simulating corresponding position of the original picture on a monitor screen with a digitizer. This kind of procedure can be performed by using a conventional method.

Figure 6A:
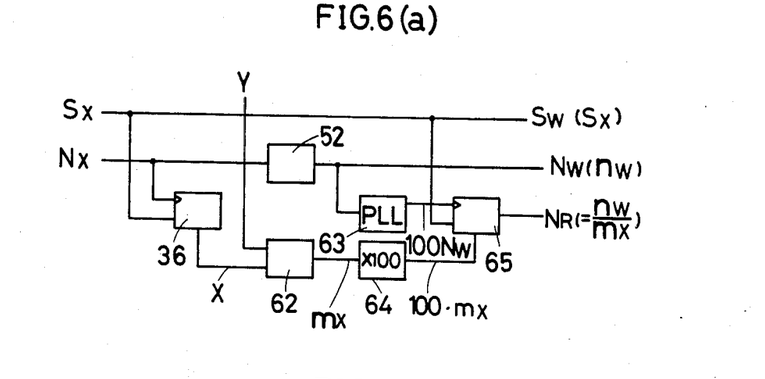
FIG. 6a–b show block chart S of another circuit for obtaining the reproduction image shown in FIG. 4.

FIGS. 6(a)(b) show an embodiment of the timing pulse generator 15, from which said synthesizers 53 and 54 are eliminated. FIG. 6(a) shows a timing pulse generator in which the frequency (($n_W$)) of the writing pulse ($N_W$) is fixed while the frequency (($n_R$)) of the reading pulse ($N_R$) is varied according to transition of the magnification ratio. On the contrary, FIG. 6(b) shows a timing pulse generator in which the frequency (($n_R$)) of the reading pulse ($N_R$) is fixed while the frequency (($n_W$)) of the writing pulse ($N_W$) is varied according to transition of the magnification ratio.

Figure 7:
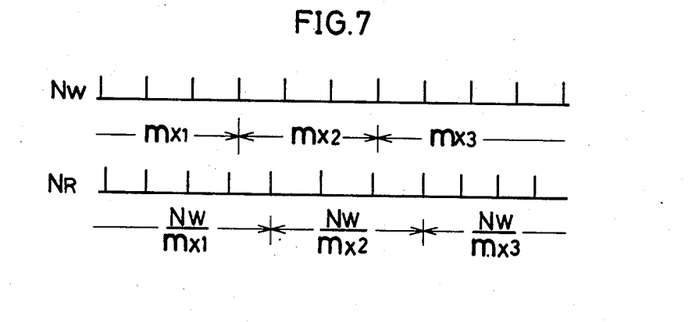
FIG. 7 shows the timing chart of the circuit shown in FIG. 6.

FIG. 7 shows a timing chart of the pulses ($N_W$) and ($N_R$), the magnification data $m_x$ output from the RAM (62) and a reading pulse ($N_R$) output from a frequency divider 65 (mentioned later) of the embodiment shown in FIG. 6(a). In the embodiment of FIG. 6(a) and the timing chart of FIG. 7, the frequency (($n_W$)) of the writing pulse ($N_W$) is multiplied by one hundred to have a capability for designating the magnification ratio by one percent. And the resultant pulse having the frequency of (($100n_W$)) is input to the frequency divider 65. Meanwhile, the magnification data $m_x$ for each interval or for each pixel are multiplied by one hundred in a multiplier 64. Then the first magnification data $m_x$ are set up in the frequency divider 65 by the main scanning start pulse ($S_X$) as a divisor. Therefore the frequency divider 65 outputs the first reading pulse ($N_R$) obtained by performing a division $100N_W/100m_x = N_W/m_x$. Then the next data 100 $m_x$ are set up in the frequency divider 65 and the next reading pulse ($N_R$) is output from the frequency divider 65. Likewise, the reading pulse ($N_R$) for each subsequent pixel is output from the frequency divider 65 successively. That is, when the magnification data of $m_{x1}$, $m_{x2}$ and $m_{x3}$ are input to the frequency divider 65 successively, it outputs the reading pulse ($N_B$) having the frequency of ($N_W/m_x$)) (particularly $N_W/m_{x1}$, $N_W/m_{x2}$ and $N_W/m_{x3}$) are output successively.

Figure 6B:
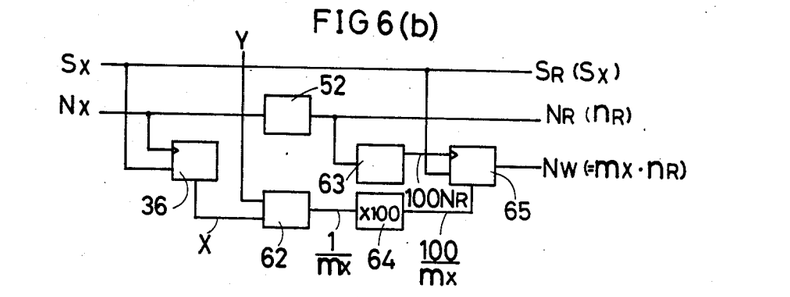

FIG. 6(b) shows an embodiment of the timing pulse generator 15, to which instead of a synthesizer, a method is adapted for varying the frequency ($n_W$) of the writing pulse ($N_W$) while fixing the frequency ($n_R$) of the reading pulse ($N_R$) is adopted. In the embodiment of FIG. 6(b), on the contrary to the embodiment of FIG. 6(a), the inverse magnification data $1/m_x$ is stored in the RAM 62.

Incidentally, if the frequency divider 65 is used in the embodiments of FIG. 3 or FIG. 5 instead of the synthesizer 53, the inverse magnification ratio setters 21 to 23 can be replaced with magnification ratio setters, and the RAM 61 can be informed with magnification ratios.

Figure 8:
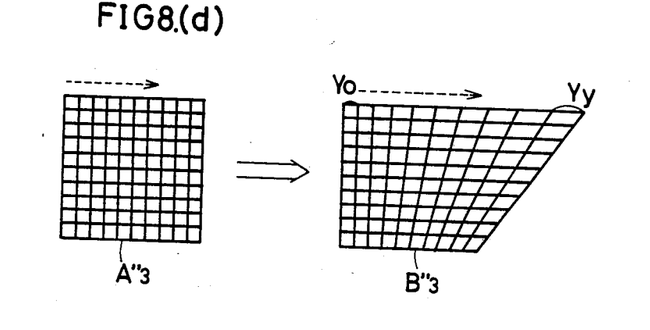

By the way, in the interval between $Y_2$ and $Y_3$ of FIG. 4, each main scanning line must be reproduced in a distinct magnification ratio. Therefore, magnification data for each scanning line must be stored in the RAM 62, which also requires the RAM 62 to have a large capacity. As against the reproduction images of FIG. 2 and FIG. 4, to obtain a complicated reproduction image as shown in FIG. 8, the magnification ratio for the sub-scanning direction factor of some scanning lines must be varied. In this case, magnification data for each pixel must be stored in the RAM 62, which further compels the RAM 62 to have a vast capacity. So the following method is prepared for the transition of the magnification ratio. That is, beforehand the RAM is provided parameters of an equation which represents the transition of the magnification ratio for the main and the sub-scanning direction factors. A computation means computes the magnification ratio for each scanning line on occasion according to the parameters to obtain a writing pulse ($N_W$) and control pulses for the input and the output heads. The following explanation is based on FIGS. 8, 9 and 10.

Figure 8A:
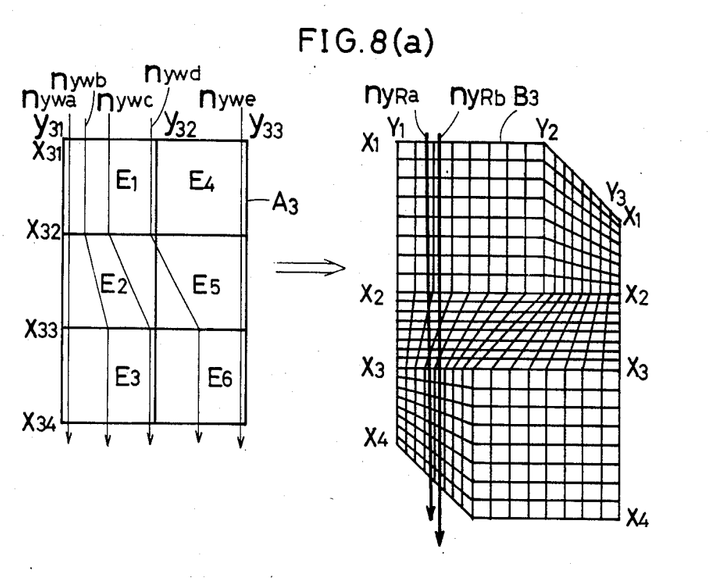

In FIG. 8(a), portions $E_1$ (surrounded by lines $X_{31}$, $X_{32}$, $Y_{31}$ and $Y_{32}$) and $E_6$ (surrounded by lines $X_{33}$, $X_{34}$, $Y_{32}$, $Y_{33}$) of an original picture $A_3$ are enlarged when the original picture $A_3$ is reproduced as a reproduction image $B_3$. The reproduction image $B_3$ is obtained by varying the frequency (($n_W$)) of the writing pulse ($N_W$) and the feeding pitch of the input head while fixing the frequency (($n_R$)) of the reading pulse ($N_R$) and the feeding pitch of the recording head. In this case, the input head is fed in the sub-scanning direction in various feeding pitches as shown by solid arrows on the original picture $A_3$ when it performs main scanning work. Then obtained pixel data are stored into the internal memory of the computer module according to the writing pulse ($N_W$) of each corresponding magnification ratio.

Figure 8B:
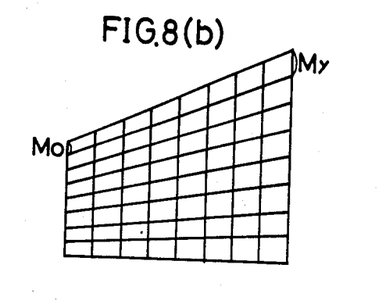

Hereupon the magnification ratio of the main scanning direction factor M of the writing pulse ($N_W$) can be expressed by an equation:

$$M = M_o + c \cdot m_1 \cdot d \cdot n_y + e \cdot m_2 \cdot f \cdot n_x \quad (1)$$

wherein the first term of the right member $M_o$ is the magnification ratio of the initial pixel of a portion such as ($E_1$) ($E_2$) . . . The second term $c \cdot m_1 \cdot d \cdot n_y$ means the transition of the magnification ratio of the main scanning direction factor in company with progress of the feeding of the recording head toward the sub-scanning direction. In this second term, c assumes the value "1" when the magnification ratio has to be changed, or assumes the valuve "0" when the magnification ratio does not need to be changed in scanning a portion like ($E_3$) or ($E_4$), $m_1$ is the magnification rate of change in company with the number of the main scanning lines $n_y$, which can be represented as $m_1 = |M_o - M_y|/n_{yo}$ ($M_y$: the magnification ratio of the first pixel of the next line of the last scanning line of the portion $B'_3$ as shown in FIG. 8(b), $n_{yo}$: the number of the main scanning lines of a portion as shown in FIG. 8(b)), while d is mentioned later.

Figure 8C:
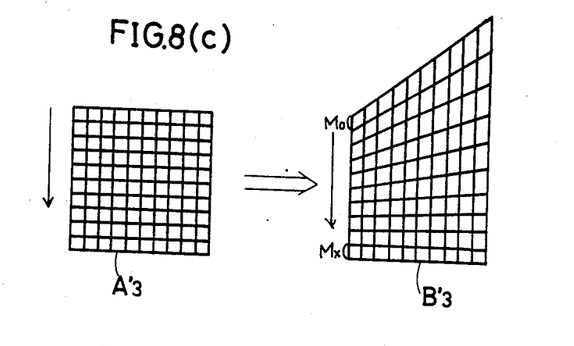

The third term $e \cdot m_2 \cdot f \cdot n_x$ means the transition of the magnification ratio of pixels of a main scanning line for a case in which an original picture A′$_3$ is reproduced as B′$_3$ as shown in FIG. 8(c). In the third term, e assumes the value "1" when the magnification ratio for each pixel of a main scanning line has to be changed, or assumes the value "0" when the magnification ratio does not need to be changed in scanning a portion as shown in FIG. 8(c), m$_2$ is the magnification rate of change in company with progress of the main scanning process, which can be represented as m$_2$=|M$_o$−M$_x$|/n$_{xo}$ (M$_x$: the magnification ratio of the next pixel of the last pixel of the last main scanning line of the portion B″$_3$ as shown in FIG. 8(c), n$_{xo}$ the frequency of the writing pulse of the main scanning direction factor for a portion like B″$_3$), n$_x$: the frequency of the writing pulse of the main scanning direction factor, while f is mentioned later.

Therefore, the equation (1) can be converted into an equation:

$$M = M_o + c \cdot \frac{|M_o - M_y|}{n_{yo}} \cdot d \cdot n_{yw} + e \cdot \frac{|M_o - M_x|}{n_{xo}} \cdot f \cdot n_x \quad (2)$$

Assuming that d=f=1 when M$_y$>M$_o$ and M$_x$>M$_o$, or d=f=−1 when M$_o$>M$_y$ and M$_o$>M$_x$, the equation (1) can be expressed as an equation:

$$M = M_o + c \cdot \frac{M_y - M_o}{n_{yo}} 19 \, n_{yw} + e \cdot \frac{M_x - M_o}{n_{xo}} \cdot n_x \quad (3)$$

as a conclusion.

By the way, the first pixel of each scanning line of such as an interval between Y$_2$ and Y$_3$ of FIG. 8(a) situates on a line having a certain inclination. Therefore, the first pixel position of each scanning line corresponds to the address X′ of a memory expressed by an equation:

$$X' = X_o + a \cdot x \cdot b \cdot n_{yw} \quad (4)$$

wherein the first term "X$_o$" is the address of the memory corresponding to the primary pixel of a portion such as E$_4$ (in this case, the intersecting point of lines X$_1$ and X$_2$), "a" assumes a value "1" when the magnification ratio must be changed for the subsequent scanning line, or a value "0" when the ratio does not have to be changed, "X" is the change of rate of the addresses |X$_o$−X$_y$|/n$_{yo}$ (X$_y$: the address corresponding to the primary pixel of the next line of the last scanning line of a portion such as E$_4$, b assumes a value b=1 when the subsequent address number increases, or assumes a value b=−1 when it decreases.

Then the equation (4) can be converted into an equation:

$$X' = X_o + a \cdot \frac{|X_o - X_y|}{n_{yo}} \cdot b \cdot n_{yw} \quad (5)$$

and can be reconverted into an equation:

$$X' = X_o + a \cdot \frac{|X_o - X_y|}{n_{yo}} \cdot n_{yw} \quad (6)$$

because b=1 when X$_y$>X$_o$, b=−1 when X$_y$<X$_o$. By the equations (1) and (4), the magnification ratio M of the main scanning direction and the address X′ can be determined.

Figure 9:
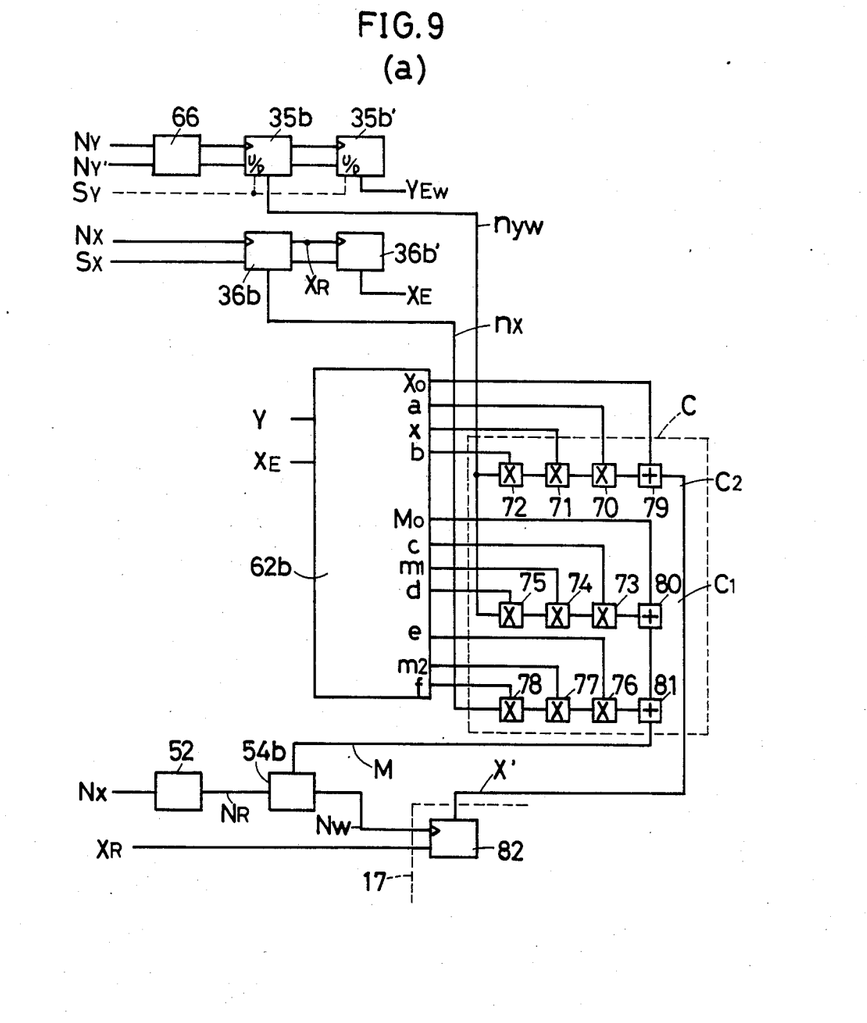
FIG. 9a–b show block chart S of a circuit for obtaining the reproduction image shown in FIG. 8a–d.

FIG. 9 shows a circuit for obtaining the magnification ratio of each pixel by using the equation (1) and (4).

At first, a detector 13 on the linear encoder 11 shown in FIG. 2 inputs two position pulses (N$_Y$) and (N$_y$′), to a direction detector 66 of FIG. 9. The direction detector 66 detects a phase difference α between the two position pulses (N$_Y$) and (N$_Y$′) or 180°+α to confirm whether the input head 5 of FIG. 2 moves to the positive sub-scanning direction or to the negative sub-scanning direction. According to a detected condition, the direction detector 66 gives a command to increase or decrease the count numbers of the counters 35b and 35b′ while it inputs the position pulses (N$_y$) or (N$_y$′) to the counters 35b and 35b′. and When the input head 5 moves toward the positive sub-scanning direction, the counter 35b counts up the position pulse (N$_Y$) or (N$_y$′). When the input head 5 moves toward the anti-subscanning direction, the counter 35b counts down the position pulse (N$_Y$) or (N$_Y$′). The counter 35b inputs thus obtained count number co a calculator C as position data n$_{yw}$ of the sub-scanning direction factor.

Meanwhile, portions as shown as E$_1$ or E$_2$ in FIG. 8(a) are specified by the count number of the counter 35b′. That is, the count number of the counter 35b′ is counted up or down by the position pulse (N$_Y$) or (N$_Y$′) like in the counter 35b, and then the count number is input to a RAM 62b as portion data (Y$_{EW}$). Furthermore, the sub-scanning start pulse (S$_Y$) is input to the counters 35b and 35b′, each of which counter number is cleared every time the sub-scanning start pulse (S$_Y$) is input thereto.

On the other hand, the n time pulse (N$_X$) and the main scanning start pulse (S$_X$) are input from the rotary encoder 3 to the counters 36b and 36b′. The counter 36b inputs the position data (n$_x$) of the main scanning direction factor to the calculator C. While the counter 36b′ inputs portion data (X$_E$) to the calculator C. In this case, as against to the embodiments of FIG. 5 and FIG. 6, the RAM 62b is provided with parameters such as M$_o$, c, m$_1$, d, e, m$_2$ and f of the equation (1) and X$_o$, a, x, and b of the equation (4) for each portion. For example, parameters of each scanning line of the portion E$_1$, E$_2$ or E$_3$ shown in FIG. 8 are successively read to the calculator C in due input scanning order.

The caluclator C comprises a magnification calculator C$_1$ for computing the equation (1) and an address caclulator C$_2$ for calculating the equation (4). The magnification computer unit C$_1$ for calculating the equation (1) is composed of multipliers 73, 74, and 75 for multiplying the parameters c, m$_1$, d by said sub-scanning position data (n$_{YW}$) of each of the pixels being input from the counter 35b, multipliers 76, 77 and 78 for multiplying the parameters e, m$_2$, and f by said main scanning position data (n$_x$) of each pixel being input from the counter 36b, and adders 80 and 81 for summing up the first, and the second term obtained by using the multipliers 73 to 78 and the third term M$_o$. The magnification ratio M obtained by the magnification calculator C$_1$ is input to a synthesizer 54b. For this synthesizer 54b, no explanation is given here because its function is the same as the synthesizer shown in FIG. 5.

The address calculator C$_2$ is composed of multipliers 70, 71 and 72 for multiplying the parameters a, x and b of the equation (4) by the main scanning position data (n$_{yw}$) and an adder 79 for summing up the term obtained by using the multipliers 70 to 72 and the term X$_o$. The resultant value is input as a pre-set number to an address counter 82 provided in the computer module 17 on command of a portion start edge signal (X$_R$). The address counter 82 is provided for generating a writing address signal for the internal memory 17' the computer module 17.

On the other hand, magnification conversion for the sub-scanning direction is performed by varying the feeding speed of the input head 5 as against to that of the recording head 6. In this case, the sub-scanning direction address Y' is expressed by an equation:

$$Y' = Y_o + g \cdot y_1 \cdot h \cdot n_{yR} + i \cdot y_2 \cdot j \cdot n_x \qquad (7)$$

wherein the first term $Y_o$ of the right member is the primary Y (sub-scanning) direction address of the input head, the second term becomes valid when the magnification rate of the sub-scanning direction factor varies in accord with advance of the sub-scanning process as shown by a broken arrow in FIG. 8(d) and the third term becomes valid when the magnification rate of the sub-scanning direction factor changes in accordance with advance of the main scanning process. In the second term, g assumes a value "1" when the input head 5 must be shifted in a main scanning line or assumes the value "0" when it does not have to be shifted, $y_1$ is the magnification rate of change of the sub-scanning direction factor expressed by an equation: $Y_1 = |Y_o - Y_y|/n_{yo}$ ($Y_y$: the primary sub-scanning address of the next line of the last scanning line of the portion) and h assumes a value "1" when the magnification rate of change is positive or assumes a value "0" when it is negative. In the third term, i assumes a value "1" when the magnification rate of the sub-scanning direction factor varies or assumes the value "0" when it doesn't vary, $Y_2$ is the magnification rate of change of the sub-scanning direction factor expressed by an equation; $Y_2 = |Y_o - Y_x|/n_{xo}$ ($Y_x$: the primary sub-scanning address of the next line of the last scanning line of the portion), and j assumes a value "1" when the magnification rate of change is positive or assumes a value "0" when it is negative. The equation (7) can be converted into an equation:

$$Y' = Y_o + g \cdot \frac{Y_o - Y_y}{n_{yo}} \cdot n_{yR} + \cdot \frac{Y_o - Y_x}{n_{xo}} \cdot n_x \qquad (8)$$

in the same manner for the equtions (1) and (4).

Figure 9B:
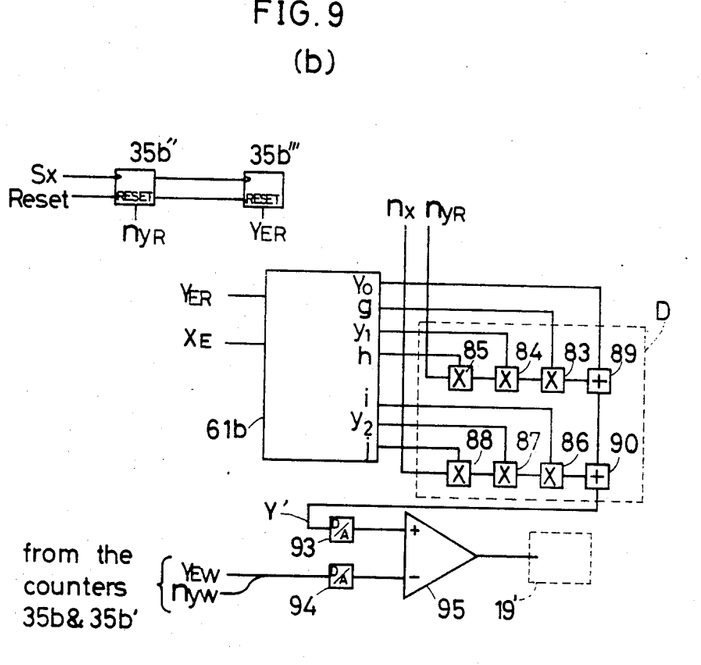

FIG. 9(b) shows a circuit for giving a motor control signal to a motor control circuit for the motor 9. The motor control signal is the sub-scanning direction address signal generated in the same manner for the main scanning direction factor.

In the circuit shown in FIG. 9(b), the main scanning start pulse ($S_X$) is input to the counters 35b" 35b''' every time the input scanning drum revolves once. According to the main scanning start pulse ($S_x$), the counter 35b" and 35b''' sub-scanning position data ($n_{yR}$) and portion data ($Y_{ER}$) respectively. The count numbers of the counters 35b" and 35b''' are reset to zero every time the recording scanning work is begun. A RAM 61b is provided with the parameters $Y_o$, g, $y_1$, h, i, $y_2$, j of each portions beforehand, and outputs corresponding ones to a calculator D according to the portion data ($Y_{ER}$) and ($X_E$). The calculator D performs a calculation of the equation (7) according to the main scanning position data ($n_x$) of the input side and to the sub-scanning position data ($n_{yR}$) of the output side being input from the counters 36b and 35b" respectively.

Structure of the calculator D is approximately as same as that of the calculator C shown in FIG. 9(a). That is, multipliers 83, 84 and 85 are provided for calculating the second term of the right member of the equation (7), multiplier 86, 87 and 88 are provided for calculating the third term of the right member of the equation (7), adders 89 and 90 are provided for calculating Y' of the equation 7.

The thus obtained sub-scanning position Y' of the input head 5 undergoes digital-analog conversion in a digital/analog converter 93 to be input to the plus terminal of a comparator 95. While the sub-scanning position data ($n_{yw}$) and the portion data ($Y_{EW}$) the counters 35b and 35b' undergoes digital-analog conversion in a digital analog converter 94 to be input to the minus terminal of the comparator 95. Therefore until the level of the input data coincides, the comparator 95 outputs the motor control signal to a motor controller 19' for feeding the input head 5 forward or backward in the sub-scanning direction. In this, the motor controller can either be the same as in FIG. 3 or not. At any rate, no explanation for it is given here because it can be easily realized.

To the abovementioned embodiments, a method of magnification conversion, in which conversion of the main scanning direction magnification is attained by varying the relative feeding speed between the input head and the recording head is used, whereas another type can also be adopted. For example, the method disclosed in U.S. Pat. No 4,163,605 and in U.S. application Ser. No 933,714 can be adopted. The method comprises the following steps. At first the revolution frequency of the recording drum, the feeding speed of the recording head and the revolution frequency of the input head are fixed regardless of variation of the magnification ratio. Then magnification conversion for the sub-scanning direction factor is performed by varying the feeding speed of the input head. Feeding speed variation in the main scanning direction is performed at first by fixing the relative frequency between the writing pulse and the reading pulse for a memory at 1:1, then by reading image data from thus conditioned memory in a skipped or in an overlapped fashion of their addresses. As a magnification conversion method, the following methods can be used instead. One of the method is to control the revolution frequency of one of independently driven input and output drums by using a controller as shown in FIG. 9(b). Another method is to vary the frequency of the reading pulse and the feeding speed of the recording head while fixing the frequency of the writing pulse and the feeding speed of the input head according to the magnification ratio. Another method is that image data of an original picture are stored into a memory without performing magnification conversion and then the image data are read according to address data determined by said equation (1) and (7) (in this condition, the inverse value of $m_1$, $m_2$, $y_1$, $y_2$ are used instead). In this method, the image data can unergo magnification conversion only of the main scanning direction factor when they are stored into the memory.

When the motor (10) can not comply with the output speed of data from the memory, a secondary memory can be used. The secondary memory holds the data from said memory beforehand to output them to the recording head 6.

Incidentally, detail emphasis or color correction operations can be performed with the magnification conversion operation.

The above explanation is based on a drum scanner, however the method of this invention can also be applied to such as a laser beam scanner or a television.

Furthermore, by inputting a more complicated transformation data of such as square, rhombic, circular, triangular, polygonal or starry shape into the RAM 62, corresponding transformation image can be obtained.

As mentioned above, the method of this invention is capable of performing partial distortion (especially enlargement) on a reproduction image by using a simple circuit, which also produces as a result an economic and impressive image. Therefore, when the method is applied to such as a leaflet or a pamphlet, the resultant images may gain attractiveness.

I claim:

1. A method for recording a partially distorted image in reproducing images by using a scanner in which image data obtained by scanning an orginial picture are used for recording a photosensitive film comprising the steps of:
    (a) determining different magnification ratios for each of at least two portions of the orginal picture by using pre-determined data;
    (b) selecting said magnification ratios separately for different directions along the original picture;
    (c) setting the magnification ratio data in magnification ratio setters or in inverse magnification ratio setters; and
    (d) performing a transformation according to the magnification ratios.

2. A method claimed in claim 1 in which the pre-determined data are composed of position data for varying the magnification ratio.

3. A method claimed in claim 1 in which the pre-determined data comprise magnification data.

4. A method as claimed in claim 3 wherein said step of setting up the magnification data in addresses of a random access memory includes the step of inputting the magnification data on a keyboard.

5. A method claimed in claim 1 in which the image reproducing system comprises a memory to which digital image data obtained from the original picture are written and from which the digital image data are read, and comprising the step of adjusting reading speed and writing speed to correspond to a desired magnification ratio for each portion.

6. A method claimed in claim 1 in which the image reproducing system comprises a memory to which digital image data obtained from the original picture are written and from which the digital image data are read, and comprising the step of reading the image data from the memory in a skipped or in an overlapped fashion while keeping writing speed and reading speed constant.

7. A method claimed in claim 1 in which the ratio of (a) a relative speed between the original picture and an input head and (b) a relative speed between a photosensitive film and a recording head corresponds to a desired magnification ratio for each portion.

8. A method claimed in claim 1 in which all the image data of the original picture are stored in a memory and are read by controlling the memory addresses according to desired magnification ratio for each of said portions.

9. A method claimed in claim 8 comprising the step of storing the data read from the memory are in another memory to be used for driving an output image recording head.

10. A method claimed in claim 1 comprising the further step of performing a detail emphasis or a color correction work on the image data.

11. A method for recording a partially distorted image in reproducing images by using a scanner in which image data obtained by scanning an original picture are used for recording a photosensitive film comprising the steps of:
    (a) determining different magnification ratios for each of at least two portions of the original picture by using pre-determined data;
    (b) selecting said magnification ratios seaprately for different directions along the original-picture; and
    (c) performing a transformation according to the magnification ratios, wherein the pre-determined data comprise parameters of a general equation for designating transition magnification ratios for transition regions wherein said magnification ratios change substantially continuously from a first magnification ratio value in one portion of the picture to a second magnification ratio value in another portion of the picture and
    (d) comprising the further step of setting up the transition magnification ratios in addresses of a random access memory corresponding to respective positions of the original picture.

12. A system for recording a partially distorted image in reproducing images by using a scanner in which image data obtained by scanning an original picture are used for recording photosensitive film comprising:
    (a) a means for determining different magnification ratios for each of at least two portions of the original picture by using pre-determined data;
    (b) means for selecting said magnification ratios separately along different directions of the original picture; and
    (c) a means for performing a partial distortion operation according to the magnification ratio, wherein
    (d) said means for determining magnification ratios is composed of a means for setting up position data for varying the magnification ratio and magnification ratio setters for memorizing magnification ratio data or for varying the inverse magnification ratio setters for memorizing inverse magnification ratio data for each of said portions.

13. A system claimed in claim 12 in which the means for determining magnification ratios comprises:
    (a) a random access memory in which certain addresses store parameters store of a general equation for designating magnification ratios for corresponding positions of the original picture; and
    (b) a computation means for performing computation of the general equation according to the magnification ratio data of the corresponding addresses.

14. A system claimed in claim 12 further comprising means for providing a predetermined magnification for a predetermined region of said original picture by providing a first magnification ratio for a first region extending along one direction of the original, and for providing a second magnification ratio for a seocnd region extending along a second direction of the original, wherein said first and second regions are selected to have an intersection forming said predetermined region of said original and wherein said first and second magnification ratios, combined, provide said predetermined magnification.

15. A system as claimed in claim 12 wherein said means for setting up the position data includes keyboard means for inputting said position data for varying said magnification ratio and said magnification ratio setters.

16. A system for recording a partially distored image in reproducing images by using a scanner in which image data obtained by scanning an original picture are used for recording photosensitive film comprising:
   (a) a means for determining different magnification ratios for each of at least two portions of the original picture by using pre-determined data;
   (b) means for selecting said magnification ratios seaprately along different directions of the original picture; and
   (c) a means for performing a partial distortion operation according to the magnification ratio;
   wherein the means for determining magnification ratios comprises: means for designating transition magnification ratios for transition regions wherein said magnification ratios change substantially continuously from a first magnification ratio value in one portion of the picture to a second magnification ratio value in another portion of the picture; and
   a random access memory in which certain locations are identified by addresses corresponding to respective portions of the original picture and wherein the pre-determined data are set up in said certain locations.

17. A system claimed in claim 16 further including means for storing the transition magnification ratios in storage locations of said random access memory, said storage locations corresponding to respective positions of the original picture.

18. A method of recording a transformed image of an original picture by varying a magnification ratio in each scanning direction on the basis of a position of a scanning head in relation to the original comprising the steps of:
   (a) driving a recording head at a constant speed in a subscanning direction by providing a constant frequency to a corresponding motor;
   (b) selecting one of a plurality of inverse magnification ratios in the subscanning direction for each portion of the original;
   (c) inputting the selected inverse magnification ratio to a synthesizer means for varying said constant frequency by said inverse magnification ratio;
   (d) providing the varied frequency to the motor for driving the scanning head in the subscanning direction;
   (e) selecting one of a plurality of magnification ratios in a main scanning direction for each portion of the original;
   (f) inputting the selected magnification ratio to a means for varying a constant frequency by the magnification ratio; and
   (g) changing a first frequency associated with image data stored in a memory means to a second frequency associated therewith, thereby to provide different reading and writing frequencies for the data.

19. A method as recited in claim 18 wherein said step of changing the first frequency comprises the step of providing the varied reading frequency as a writing frequency for writing image data to a memory means thereby to vary magnification of the image data read from the memory in a main scanning direction.

20. A method as recited in claim 20 in which the steps (b) and (e) comprise the further steps of:
   (a) indicating the position of the scanning head in each of the scanning directions by means of counters;
   (b) determining portions of the image for varying the magnification ratio by means of address setters;
   (c) comparing the output from the counters with addressed determined by the address setters by means of comparators;
   (d) inputting the output from the comparators to AND gates; and
   (e) selecting an inverse magnification ratio or a magnification ratio determined by inverse magnification ratio setters or magnification by ratio setters by means of selectors.

21. A method as recited in claim 19 wherein said step of selecting one of a plurality of inverse; magnification ratios comprises the step of reading one of a plurality of inverse magnification ratios stored in an inverse memory based on a position of the scanning head in the subscanning direction, and
   wherein said step of selecting one of a plurality of magnification ratios comprises the step of reading one of a plurality of magnification ratios stored on the basis of the position of the scanning head in each scanning direction.

22. A method as recited in claim 21 wherein said step of reading one of a plurality of magnification ratios comprises the step of reading the magnification ratio from a plurality of magnification ratios previously stored in a magnification ratio memory and wherein said second mentioned inputting step comprises the step of inputting the selected magnification ratio to a synthesizer which varies the constant reading frequency by the magnification ratio.

23. A method as recited in claim 18 wherein said step of selecting one of a plurality of inverse magnification ratios comprises the step of reading one of a plurality of inverse magnification ratios stored in an inverse memory based on a position of the scanning head in the subscanning direction,
   wherein said step of selecting one of a plurality of magnification ratios comprises the step of reading one of a plurality of magnification ratios stored on the basis of the position of the scanning head in each scanning direction;
   wherein said second mentioned inputting step comprises the step of inputting the selected magnification ratio to a frequency divider means for varying a constant writing frequency by the magnification ratio; and comprising the further step of
   providing the varied writing frequency as a reading frequency for reading image data from a memory means thereby to vary magnification of the image data read from the memory.

24. A method of reproducing an original picture in which a magnification ratio is determined for every element of the original comprising the steps of:
   (a) driving a recording head at a constant speed in a subscanning direction by providing a constant frequency to a corresponding motor;
   (b) reading an address of the scanning head in the subscanning direction and a parameter for each unit element of the original on the basis of the position of the recording head in both of the scanning directions;
   (c) calculating a position of the scanning head in the subscanning direction by a predetermined equation, based on the scanning address and the parameter;
(d) reading an address of the scanning head in the main scanning direction and a parameter on the basis of the position of the scanning head in both of the scanning directions;
(e) presetting said address in a memory writing counter;
(f) calculating a magnification ratio by a predetermined equation based on said parameter; and
(g) providing said magnification ratio to a synthesizes which determines a writing frequency by varying a constant reading frequency by the magnification ratio with respect to an image memory.

25. A method of reproducing an original picture comprising the steps of:
(a) scanning the whole original to store image data thereof in a memory;
(b) reading an image address in the subscanning direction and a parameter corresponding thereto and an image address in the main scanning direction and a parameter corresponding thereto for each element of the original;
(c) calculating reading addreses in each of the scanning directions on the basis of said image addresses and said parameters; and
(d) reading the image data from the memory in compliance with said calculated reading addresses to record a reproduced picture.

* * * * *